May 10, 1949.   H. A. ARNHART   2,469,624
PROTECTIVE GUARD FOR ROTARY MACHINE TOOLS

Filed July 7, 1947   2 Sheets-Sheet 1

Inventor

Harry A. Arnhart

By Clarence A. O'Brien
and Harvey B. Jacobson
Attorneys

May 10, 1949. H. A. ARNHART 2,469,624
PROTECTIVE GUARD FOR ROTARY MACHINE TOOLS
Filed July 7, 1947 2 Sheets-Sheet 2

Inventor
Harry A. Arnhart
By Clarence A. O'Brien
and Harvey B. Jacobson
Attorneys Patented May 10, 1949

2,469,624

UNITED STATES PATENT OFFICE 2,469,624

PROTECTIVE GUARD FOR ROTARY MACHINE TOOLS

Harry A. Arnhart, Tulsa, Okla.

Application July 7, 1947, Serial No. 759,401

4 Claims. (Cl. 51—269)

1

This invention relates to new and useful improvements in protective guards for rotary machine tools and more particularly to rotary cutting and abrading heads.

The primary object of the present invention is to provide a guard cover that loosely embraces a grinding head or the like in such a manner as to prevent sanded particles of work from harmfully contacting the eyes, faces or hands of the persons using the grinding head.

Another important object of the present invention is to provide a protective guard for rotary machine tools including means for selectively preventing the rotation of the guard with the machine tool on which the same is mounted.

Another object of the present invention is to provide such an attachment for rotary machine tools that will protect the operator when the cutting head of a tool "explodes" due to material failure.

A further object of the present invention is to provide an attachment for rotary machine tools that is quickly and readily applied to the drive shaft of the tool for permitting safe operation of the tool without injuring the person using the same due to grinding burns.

A still further aim of the present invention is to provide a protective guard for machine tools that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
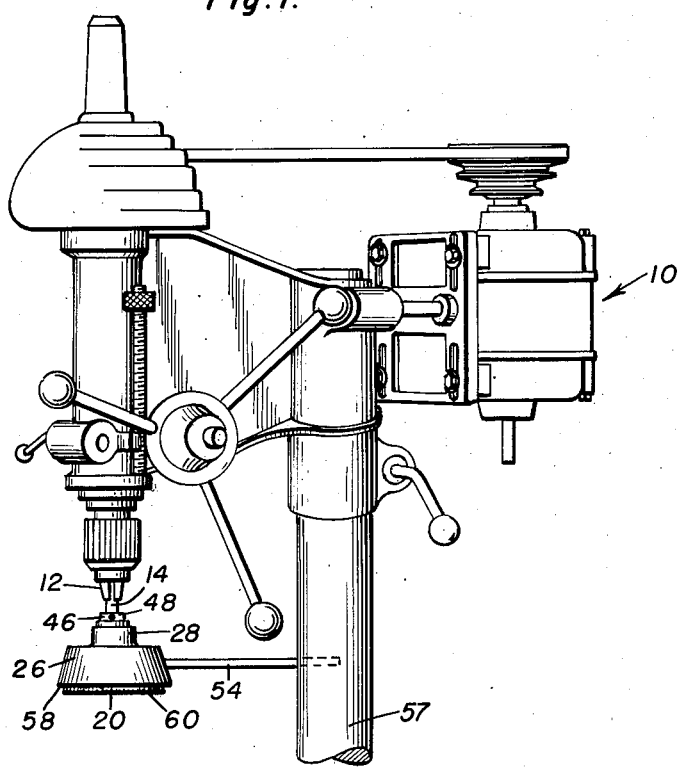
Figure 1 is a fragmentary perspective view of a drill press, the present invention applied thereto for use.
Figure 2:
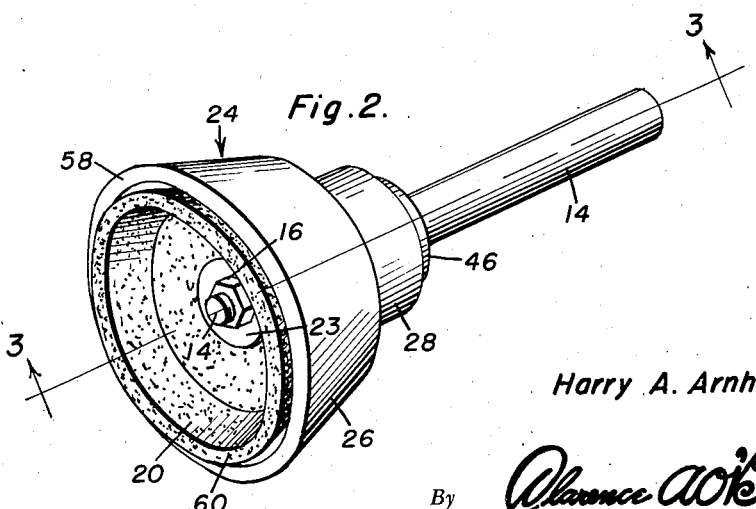
Figure 2 is a perspective view of the drive shaft and grinding head, the present invention shown in position thereon.
Figure 3:
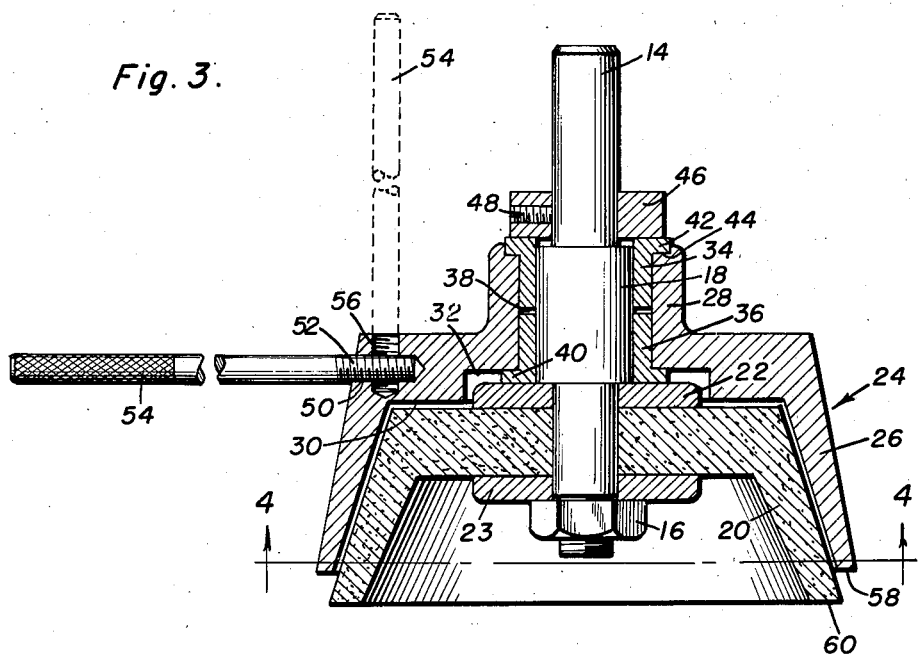
Figure 3 is an enlarged longitudinal vertical sectional view taken on line 3—3 of Figure 2.
Figure 4:
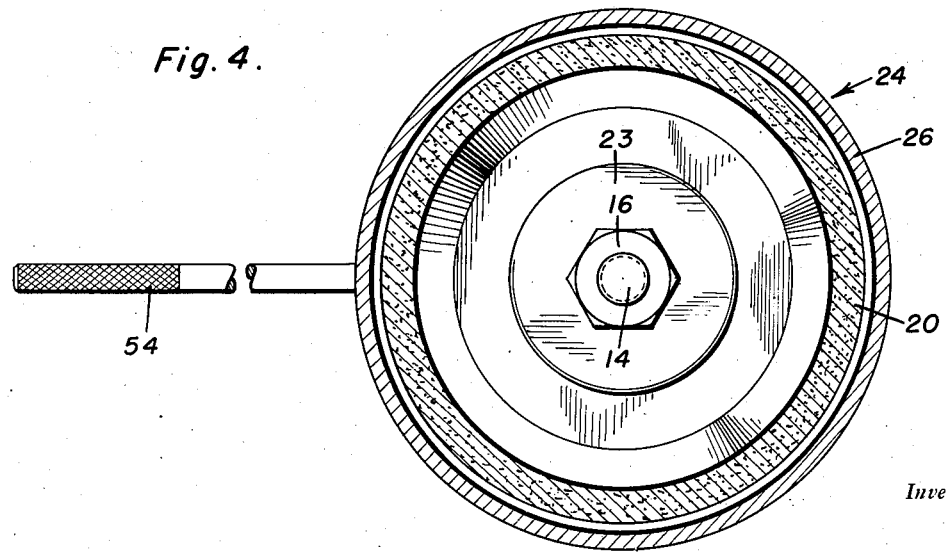
Figure 4 is a horizontal sectional view taken on line 4—4 of Figure 3.

Referring now to the drawings in detail, wherein for the purpose of illustration, there is disclosed a preferred embodiment of the present invention, the numeral 10 represents generally a conventional drill press provided with vise-like chuck 12 that tightly grips a removable drive shaft 14. Suitably mounted on the shaft inter-

2 mediate its extremities is a sleeve, stop or journal 18, which is preferably an integral part of drive shaft 14.

Journalled on the shaft between the sleeve 18 and a nut 16 engageably received on the lower end of the shaft, is a dish-like, grinding head 20. The dish-like grinding head is spaced respectively from the sleeve and the nut by washers or the like 22 and 23. By tightening nut 16, the head 20 is likewise tightened to the sleeve 18 to cause like rotation of the sanding head with the drive shaft.

The present invention does not claim the foregoing conventional structure but is merely an attachment therefor. However, the attachment may likewise be applied to other machine driven tools such as lathe machines and the like, without changing the use for which the same is intended.

The numeral 24 represents the protective guard generally comprising a dish-like element 26 and an integral hub-portion 28. The inner face 30 of this element 26 is provided with an annular recess 32 loosely surrounding the upper spacing washer 22.

Suitably mounted within the hub-portion is an upper sleeve bearing 34 and a lower sleeve bearing 36, the opposing edges of which are spaced slightly apart to form an annular groove 38 wherein oil or like lubricant is retained and which further provides a clearance space whereby the two sleeve bearings may be tightened to clamp the hub therebetween.

A flanged portion 40 of the lower bearing 36 extends between the recessed portion 32 of element 26 and washer 22, and the upper flanged portion 42 of the upper bearing 34 engages an annular recess 44 provided in the upper edge of the hub-portion 38.

Slidably and rotatably mounted on shaft 14 is a retaining collar 46 provided with a set-screw or the like 48 for adjustably tightening the collar on the shaft to prevent vertical movement of the protective guard 24.

A substantially horizontal internally threaded aperture 50 is provided in the element 26 to engageably receive the threaded portion 52 of a handle rod 54, that furnishes means for preventing the rotation of element 26 if so desired. Element 26 is further provided with a vertical internally threaded aperture 56 for receivably engaging the handle rod 54 when it is desired to dispose the handle rod parallel to the axis of the drive shaft for preventing the rotation of element 26, by resting against or clamped to a convenient stationary member 57 of the machine tool, as shown in Figure 1.

In practical use of the device, the protective guard is placed on the shaft to loosely embrace the grinding head with the lower edge 58 of element 26 slightly above the lower and cutting edge 69 of the sanding head, so that the lower edge of the sanding head may bear against the work.

As the sanding head contacts the work, the fragmentary pieces of the work will contact the guard and be deflected downwardly away from the faces of the workmen. Also, the workmen's hands will not contact the surface of the grinding head to cause burns or the like.

Obviously, the shape or size of the guard may be varied to conform to any size cutting or grinding head without diverting from the scope of the present invention.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. An attachment for machine tools having a rotary driving member; comprising a driven shaft, a grinding head removably secured to said shaft for rotation thereby, said driven shaft having a stop for limiting movement of said grinding head in one direction, spacer means between said grinding head and said stop, a guard loosely embracing said grinding head, a bearing carried by said guard embracing said stop and bearing upon said spacer means, an adjustable stop collar carried by said driven shaft engaging said bearing to limit movement of said guard relative to said grinding head, and means for holding said guard against rotation.

2. The combination of claim 1 wherein said guard includes a recessed central portion for loosely receiving said spacer.

3. An attachment for machine tools having a rotary driving member and a supporting post for said driving member; said attachment comprising a driven shaft engageable with said driving member, a grinding head removably secured to said shaft for rotation therewith, said driven shaft having a stop for limiting movement of said grinding head in one direction, spacer means between said grinding head and said stop, a guard loosely embracing said grinding head, a bearing carried by said guard embracing said stop and engaging said spacer means, an adjustable stop collar carried by said shaft engaging said bearing to limit movement of said guard relative to said grinding head, and means carried by said guard and engageable with said post for holding said guard against rotation.

4. The combination of claim 3 wherein said last-mentioned means includes a lever removably carried by said guard.

HARRY A. ARNHART.

REFERENCES CITED

The following references are of record in the file of this patent:

UNITED STATES PATENTS

| Number | Name | Date |
| --- | --- | --- |
| 1,392,325 | Hanson | Oct. 4, 1921 |
| 1,891,696 | Trimble | Dec. 20, 1932 |
| 2,320,130 | Harris | May 25, 1943 |